(12) United States Patent
Takechi

(10) Patent No.: US 8,730,907 B2
(45) Date of Patent: May 20, 2014

(54) TRANSMITTING AND RECEIVING LOCATION REGISTRATION MESSAGES AND DATA PACKETS IN A COMMUNICATION SYSTEM

(75) Inventor: Ryuichi Takechi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1056 days.

(21) Appl. No.: 12/348,401

(22) Filed: Jan. 5, 2009

(65) Prior Publication Data

US 2009/0185525 A1    Jul. 23, 2009

(30) Foreign Application Priority Data

Jan. 22, 2008   (JP) .................................. 2008-011024

(51) Int. Cl.
 *H04W 4/00* (2009.01)
(52) U.S. Cl.
 USPC ............ 370/331; 370/328; 370/338; 455/436
(58) Field of Classification Search
 None
 See application file for complete search history.

(56) References Cited

U.S. PATENT DOCUMENTS

| | | | |
|---|---|---|---|
| 6,904,466 B1 | 6/2005 | Ishiyama et al. | |
| 2002/0086674 A1 | 7/2002 | Jung | |
| 2003/0225892 A1* | 12/2003 | Takusagawa et al. | 709/227 |
| 2004/0037260 A1* | 2/2004 | Kakemizu et al. | 370/338 |
| 2009/0016298 A1* | 1/2009 | Aso | 370/331 |
| 2009/0052410 A1* | 2/2009 | Yoshida | 370/338 |

FOREIGN PATENT DOCUMENTS

| | | |
|---|---|---|
| JP | 2000-332825 | 11/2000 |
| JP | 2004-512764 | 4/2004 |
| JP | 2004-140545 | 5/2004 |
| JP | 2005-341611 | 12/2005 |
| JP | 2006-245779 | 9/2006 |
| JP | 2007-202214 | 8/2007 |
| WO | 2006/112081 | 10/2006 |

OTHER PUBLICATIONS

C. Perkins, Ed., "IP Mobility Support for IPv4," Network Working Group; Request for Comments: 3344; Obsoletes: 3220; Category: Standards Track. Ref. rfc3344.txt. The Internet Society Aug. 2002. URL: http://www.ietf.org/rfc3344.txt.

D. Johnson et. al. "Mobility Support in IPv6" Network Working Group; Request for Comments: 3775; Category: Standards Track. Ref. rfc3775.txt. The Internet Society Jun. 2004. URL: http://www.ietf.org/rfc/rfc3775.txt.

(Continued)

*Primary Examiner* — Jae Y Lee
*Assistant Examiner* — Tito Pham
(74) *Attorney, Agent, or Firm* — Myers Wolin, LLC

(57) ABSTRACT

A network system including a mobile node, a correspondent node for transmitting/receiving a data packet to/from the mobile node, a first router to which the mobile node is connected at a visited domain and a second router to which the mobile node is connected at a moving destination to which the mobile node moves from the first router. The second router including a location registration message generating unit for generating a location registration message of the mobile node and transmitting the location registration message. The first router including a binding cache, a movement managing unit for receiving the location registration message and storing into the binding cache address information from before and after the mobile node moves and an encapsulating unit for receiving the data packet, encapsulating the data packet concerned, and creating and transmitting a data packet containing as a transmission destination the address information after the change.

12 Claims, 10 Drawing Sheets

(56) References Cited

OTHER PUBLICATIONS

S. Gundavelli et al. "Proxy Mobile IPv6 draft-ietf-netlmm-proxymip6-01.txt" Internet Engineering Task Force (IETF). Work in Progress Citations. Ref. NETLMM WG Internet-Draft; Intended Status: Standards Track. Jun. 18, 2007. URL: http://www.ietf.org/ietf/1id-abastracts.txt.

Notification of Reason(s) for Refusal issued for corresponding Japanese Application No. 2008-011024, dispatched Nov. 13, 2012 with partial English translation.

Gundavelli, et al., NETLMM WG, Internet-Draft, Intended status: Standards Track, Expires: May 7, 2008, Proxy Mobile IPv6 draft-ietf-netlmm-proxymip6-07.txt, Nov. 4, 2007.

Notification of Reason for Refusal issued for corresponding Japanese Patent Application No. 2008-011024 dispatched Jun. 5, 2012 with partial English translation.

* cited by examiner

"Prior Art"

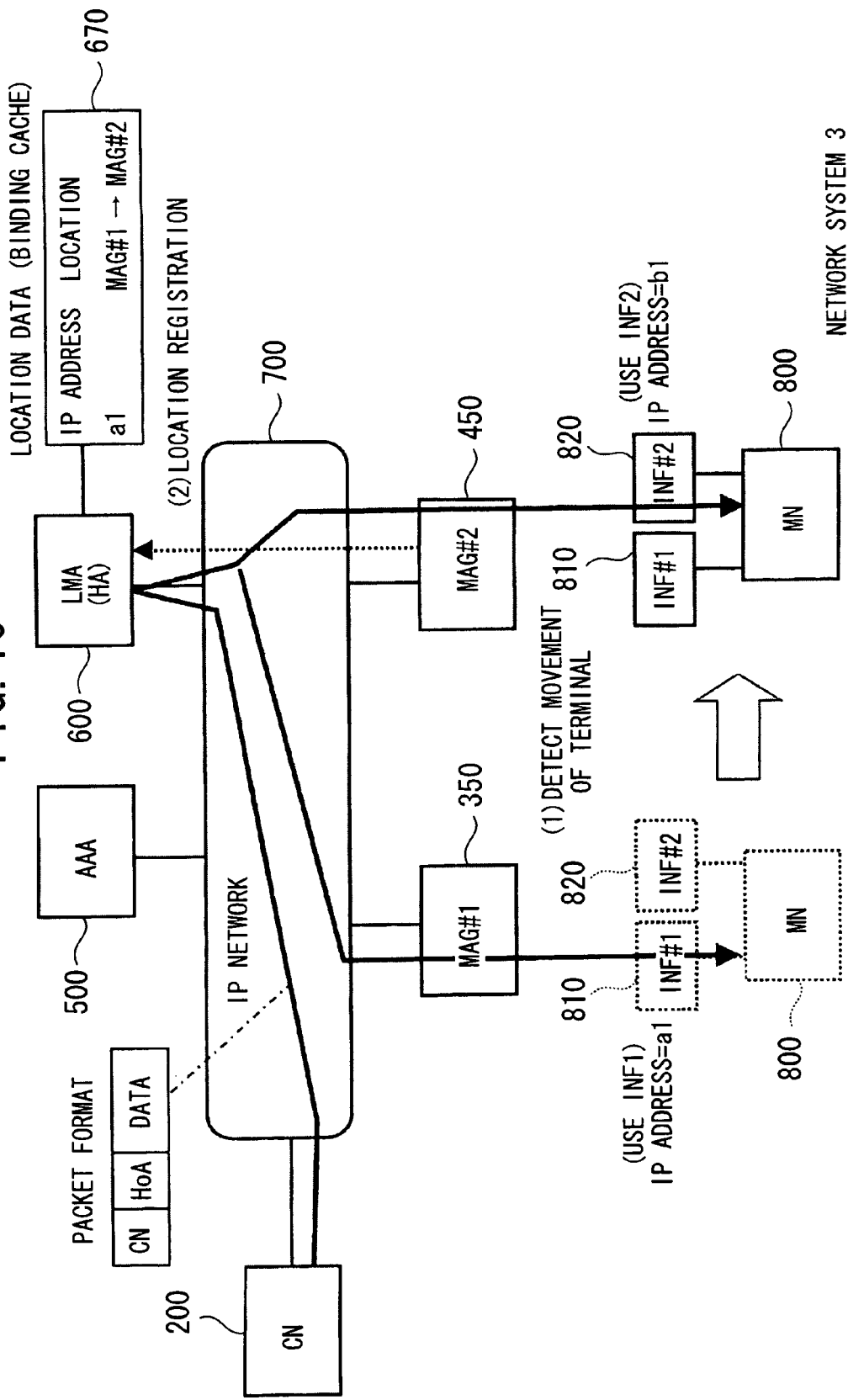

TRANSMITTING AND RECEIVING LOCATION REGISTRATION MESSAGES AND DATA PACKETS IN A COMMUNICATION SYSTEM

CROSS-REFERENCE TO RELATED APPLICATION(S)

This application is based upon and claims the benefit of priority of the prior Japanese Patent Application No. 2008-11024, filed Jan. 22, 2008, the entire contents of which are incorporated herein by reference.

FIELD

The present invention relates to a network system, a data transmitting/receiving method and a data transmission/reception program.

BACKGROUND

Mobile IP (Internet Protocol) (for example, RFC3344.txt (C. Perkins, Ed., "IP Mobility Support for IPv4", August 2002), RFC3775.txt (D. Johnson et al., "Mobility Support in IPv6", June 2004)) is known as one of the key technologies for performing seamless communication on the Internet.

FIG. 8 is a diagram showing an example of the construction of a network system based on Mobile IPv6 and an example of the operation thereof. The network system 2 has Mobile Node (MN) 800, a Correspondent Node (CN) 200 as a communication peer node of the Mobile Node (MN) 800, first and second Access Routers (AR#1, AR#2) 300, 400, an AAA server (Authentication, Authorization, and Accounting Server) 500 for performing authentication, etc. of the Mobile Node (MN) 800, Home Agent (HA) 600 as a movement managing agent of the Mobile Node (MN) 800 and an IP network 700.

The network work system 2 described above operates as follows. When the Mobile Node (MN) 800 moves from a cell under a first Access Router (AR#1) 300 to a cell under a second Access Router (AR#2) 400, the Mobile Node (MN) 800 obtains a Care-of Address from the Access Router (AR#2) 400. The Mobile Node (MN) 800 transmits a registration message (Binding Update) containing a Care-of Address (CoA#2) to a Home Agent (HA) 600. The Home Agent (HA) 600 stores the Home Address (HoA) of the Mobile Node (MN) 800 and the Care-of Address (CoA#2) into a binding cache 610 in the Home Agent (HA), and holds them for a fixed time.

Thereafter, the Correspondent Node (CN) 200 generates a data packet and transmits it to the Mobile Node (MN) 800. At this time, the transmission source address of the data packet is the address ("CN") of the Correspondent Node (CN) 200 and the Home Address ("HoA") of the Mobile Node (MN) 800.

The Home Agent (HA) 600 intercepts this packet and refers to the binding cache 610. Then, the Home Agent (HA) 600 encapsulates and transmits the packet. The transmission source address of the encapsulated packet is set to the address ("HA") of the Home Agent (HA) 600, and the destination address thereof is set to the Care-of-Access ("CoA#2") of the Mobile Node (MN) 800.

The Mobile Node (MN) takes out the data portion of the encapsulated packet to decapsulate the data and restores the packet transmitted from the Home Agent (HA) 600 to the data packet transmitted from the Correspondent Node (CN) 200.

In general, an IP application identifies a session from the pair of the transmission source and destination of the packet. With respect to the application of the Mobile Node (MN) 800, even when the Care-of Address is changed, the pair of addresses of the transmission source and the transmission destination of the packet transmitted from the Correspondent Node (CN) 200 (the address ("CN") of the Correspondent Node 200), and the Home Address ("HoA") of the Mobile Node (MN) 800 are not varied before and after the movement. Therefore, communications can continue even when the Mobile Terminal (MN) 800 is handed over.

However, Mobile IPv6 requests a protocol inherent to the mobile node, for example, the transmitting function of the registration message (Binding Update), etc. to the Mobile Node (MN) 800. Accordingly, a Mobile Node (MN) 800 which does not have the transmitting function concerned cannot utilize the Mobile IP service. Therefore, for the purpose of supplying a service equivalent to Mobile IP to a Mobile Node in which Mobile IP is not mounted as an IP stack (a function of performing communications by using IP), Proxy Mobile IPv6 has been proposed (for example, draft-ietf-netlmm-proxymip6-01.txt (S. Gundavelli et al., "Proxy Mobile IPv6", Jun. 18, 2007).

FIG. 9 is a diagram showing an example of the construction of a network system 3 based on Proxy Mobile IPv6 and an example of the operation thereof. In Proxy Mobile IPv6, a nearest router (defined as MAG (Mobile Access Gateway) in "Proxy Mobile IPv6") 450 transmits a registration message to a Home Agent (defined as LMA (Local Mobility Anchor) in "Proxy Mobile IPv6") in place of the Mobile Node (MN) 800, whereby Proxy Mobile IPv6 can continuously perform communications even when Mobile IPv6 is not mounted in the Mobile Node 800 (for example, the function of transmitting the registration message) is not mounted.

That is, when the second router (MAG#2) 450 detects that the Mobile Node 800 moves to the control thereof, the second router (MAG#2) 450 transmits the registration message (Proxy Binding Update message) to the Home Agent (LMA) 650. The Mobile Node (MN) 800 performs communications by using a specific IP address, for example, a fixed address (HoA (Home Address)). This registration message contains the fixed address (HoA). When receiving the registration message, the Home Agent (LMA) 650 stores the pair of the IP address of the Mobile Node (MN) 800 (for example, "HoA") and the address of the router (MAG#2) 450 (for example, "MAG#2") into the binding cache 620, and holds them for a fixed time.

When a packet is transmitted from the Correspondent Node (CN) 200 of the communication peer MN 800, the Home Agent (LMA) 650 intercepts this packet, and refers to the binding cache 620 to encapsulate the packet. The transmission source address of the encapsulated packet is the Home Agent (LMA) 650, and the destination address is the second router (MAG#2) 450. When receiving this packet, the second router (MAG#2) 450 decapsulates the packet, takes out the packet inserted in the data portion and then transmits the taken-out packet to the Mobile Node (MN) 800 under the control thereof. The transmission source address of this packet is the address of the Correspondent Node (CN) 200, and the destination address thereof is the IP address of the Mobile Node 800, and these addresses are identical to the addresses of the transmission source and the destination of the packet transmitted from the Correspondent Node (CN) 200. Accordingly, even when the Mobile Node (MN) moves, the communication can be continued.

A Mobile Node such as a mobile PC (Personal Computer), a cellular phone or the like can enjoy plural wireless accesses using a communication device based on external equipment such as a PC card or the like or various kinds of built-in communication devices. However, the IP address used for communications is different for every communication device or for different built-in communication devices. This is because a company for managing and issuing an IP address may change for every communication device.

On the other hand, in the above-described Proxy Mobile IP, when the communication device is changed based on the type of communication (for example, changed from wireless LAN to a cellular or the like), the Mobile Node changes the IP address used for the communication and then performs communications.

FIG. 10 is a diagram showing an example of the operation when the communication device is changed. As shown in FIG. 10, the Mobile Node (MN) 800 performs communications by using a first interface (INF#1) 810 under the control of the first router (MAG#1) 350. Thereafter, the Mobile Node (MN) 800 moves to a cell under the second router (MAG#2) 450, changes the communication device and performs communications by using a second interface (INF#2) 820. At this time, the Mobile Node (MN) 800 performs communications by using an IP address ("b1") which is different from an IP address ("a1") used under the control of the first router (MAG#1) 350.

When the IP address is changed during communication, in Proxy Mobile IP, the Mobile Node (MN) 800 executes the procedure of disconnecting a call (call release) of a route used before the communication device is changed and re-connecting a call after the communication device is changed (call re-connection).

However, the execution of the call release and the call re-connection by the Mobile Node (MN) 800 has a problem that a long service interruption may result when the communication device is switched.

Therefore, it is desirable to provide a network system in which a service interruption time is shortened, a data transmitting/receiving method in the network system and a data transmission/reception program.

SUMMARY

According to an aspect of the invention, a network system including a mobile node, a correspondent node for transmitting/receiving a data packet to/from the mobile node, a first router to which the mobile node is connected at a visited domain and a second router to which the mobile node is connected at a moving destination to which the mobile node moves from the first router. The second router including a location registration message generating unit for generating a location registration message of the mobile node and transmitting the location registration message to the first router. The first router including a binding cache, a movement managing unit for receiving the location registration message and storing into the binding cache address information from before and after the mobile node moves, an encapsulating unit for receiving the data packet from the correspondent node, encapsulating the data packet concerned, and creating and transmitting a data packet containing as a transmission destination the address information after the move which is stored in the binding cache. The mobile node including a decapsulating unit for receiving the encapsulated data packet and decapsulating the received data packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 10 is a diagram illustrating an example of the construction of the network system and data flow.

DESCRIPTION OF EMBODIMENTS

Embodiments will be described below with reference to the drawings.

Figure 1:
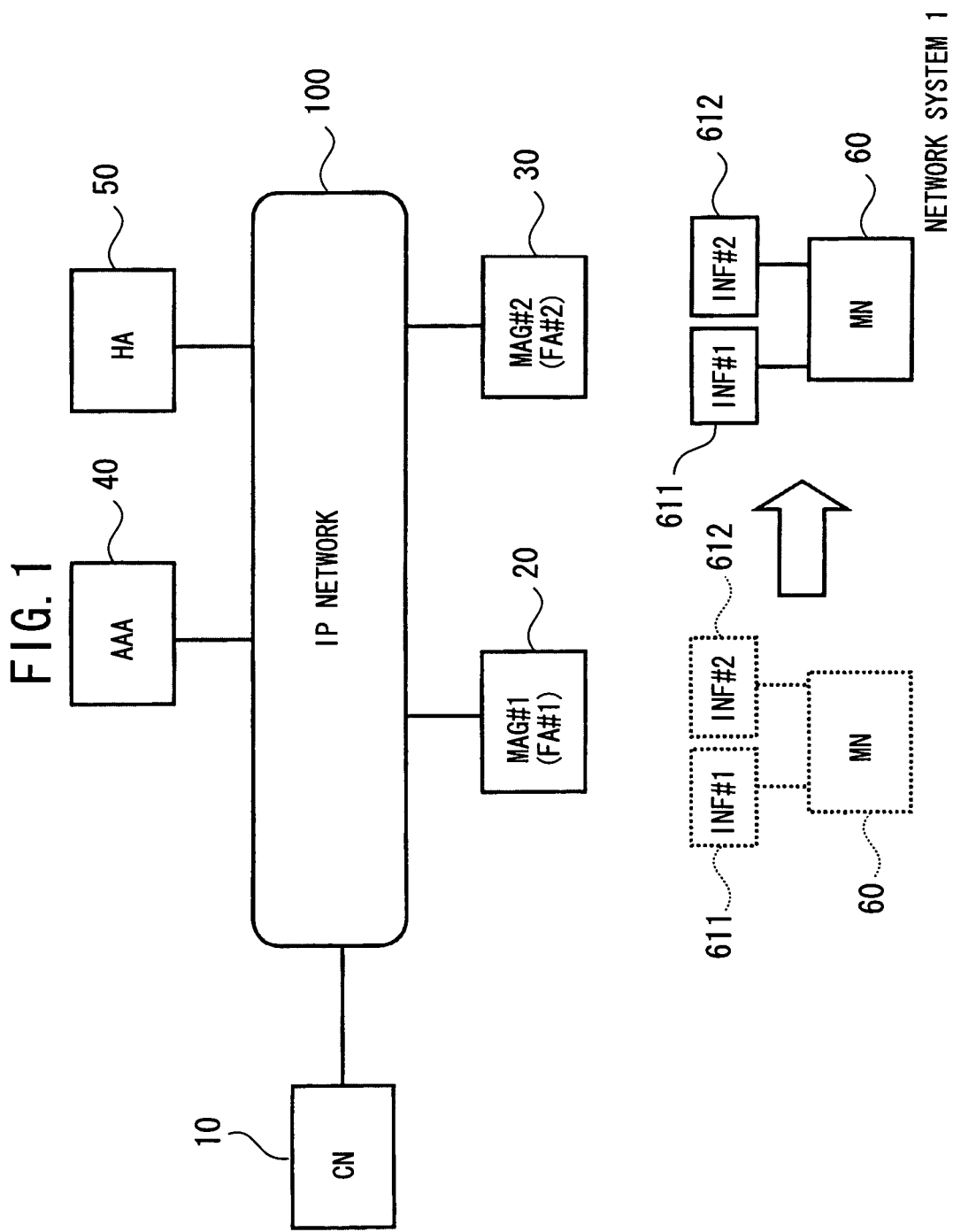
FIG. 1 is a diagram illustrating an example of the construction of a network system.

FIG. 1 is a diagram showing an example of the construction of a network system 1. The network system 1 has a Correspondent Node (CN) 10, first and second routers (FA (Foreign Agent) #1, FA#2) 20, 30, an AAA server 40, a Home Agent (HA) 50, a Mobile Node (MN) 60 and an IP network 100. The elements other than the Mobile Node (MN) 60 are connected to the IP network 100.

The Correspondent Node (CN) 10 is a communication peer of the Mobile Node (MN) 60.

The first and second routers (FA#1, FA#2) 20, 30 are typically the nearest routers located at a visited domain of the Mobile Node (MN) 60, and execute intermediate service of data addresses to the Mobile Node (MN) 60. Furthermore, the first and second routers (FA#1, FA#2) 20, 30 have the function of transmitting a location registration message (Binding Update) of the Mobile Node (MN) 60, etc., which corresponds to MAG in Proxy Mobile IPv6. In this embodiment, the first router (FA#1) is a router to which the Mobile Node (MN) 60 is first connected at the visited domain, and the second router (FA#2) 30 is a router at a handover destination.

The AAA server 40 is also a server for performing authentication, etc. In this embodiment, the AAA server 40 particularly notifies the second router (FA#2) 30 of the address of the first router (FA#1) 20 and the IP address used when communicating with the router 20 concerned. The details will be described later.

In this embodiment, the Home Agent (HA) 50 does not perform management of the present location of the Mobile Node (MN) 60, delivery of data, etc. This is because it does not hold a binding cache for managing the present location. The binding cache is held in the first router (FA#1) 20. The details will be described later.

The Mobile Node (MN) 60 has first and second interfaces (INF#1, INF#2) 611, 612. The Mobile Node (MN) 60 transmits/receives the data corresponding to each communication device by switching the interfaces (INF#1, INF#2) 611, 612 to each other.

In this embodiment, it is assumed that the mobile Node (MN) 60 moves as follows. The Mobile Node (MN) 60 communicates with the first router (FA#1) 20 from the first interface (INF#1) 611 by using the IP address "a1", and then moves. The communication based on the communication device being used is out of service at the move destination, for example. Accordingly, the Mobile Node (MN) 60 switches the communication device and communicates with the second router (FA#2) 30 from the second interface (INF#2) 612 by using the IP address "b1".

Figure 2:
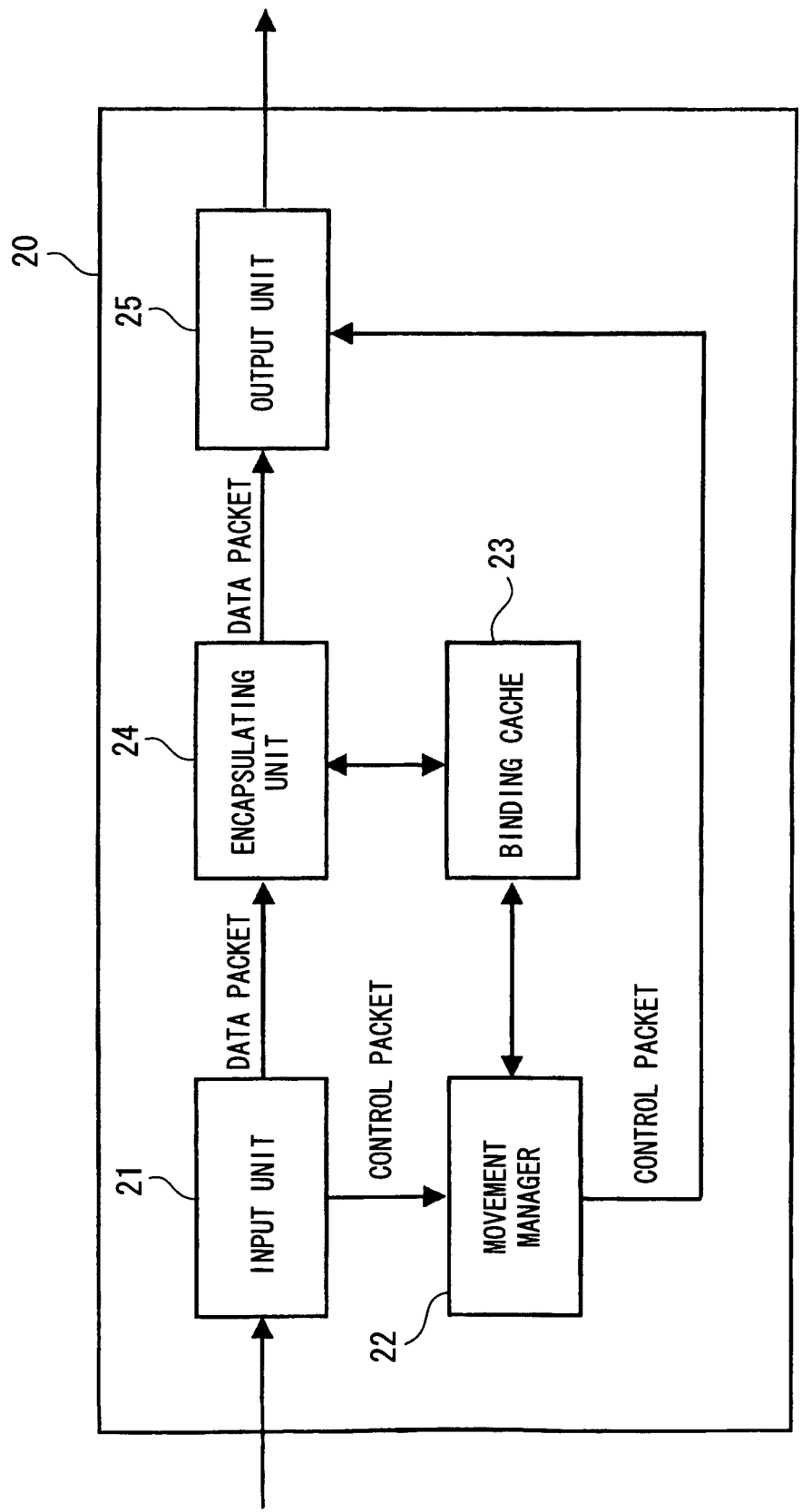
FIG. 2 is a diagram illustrating an example of the construction of a first router (FA#1)
Figure 3:
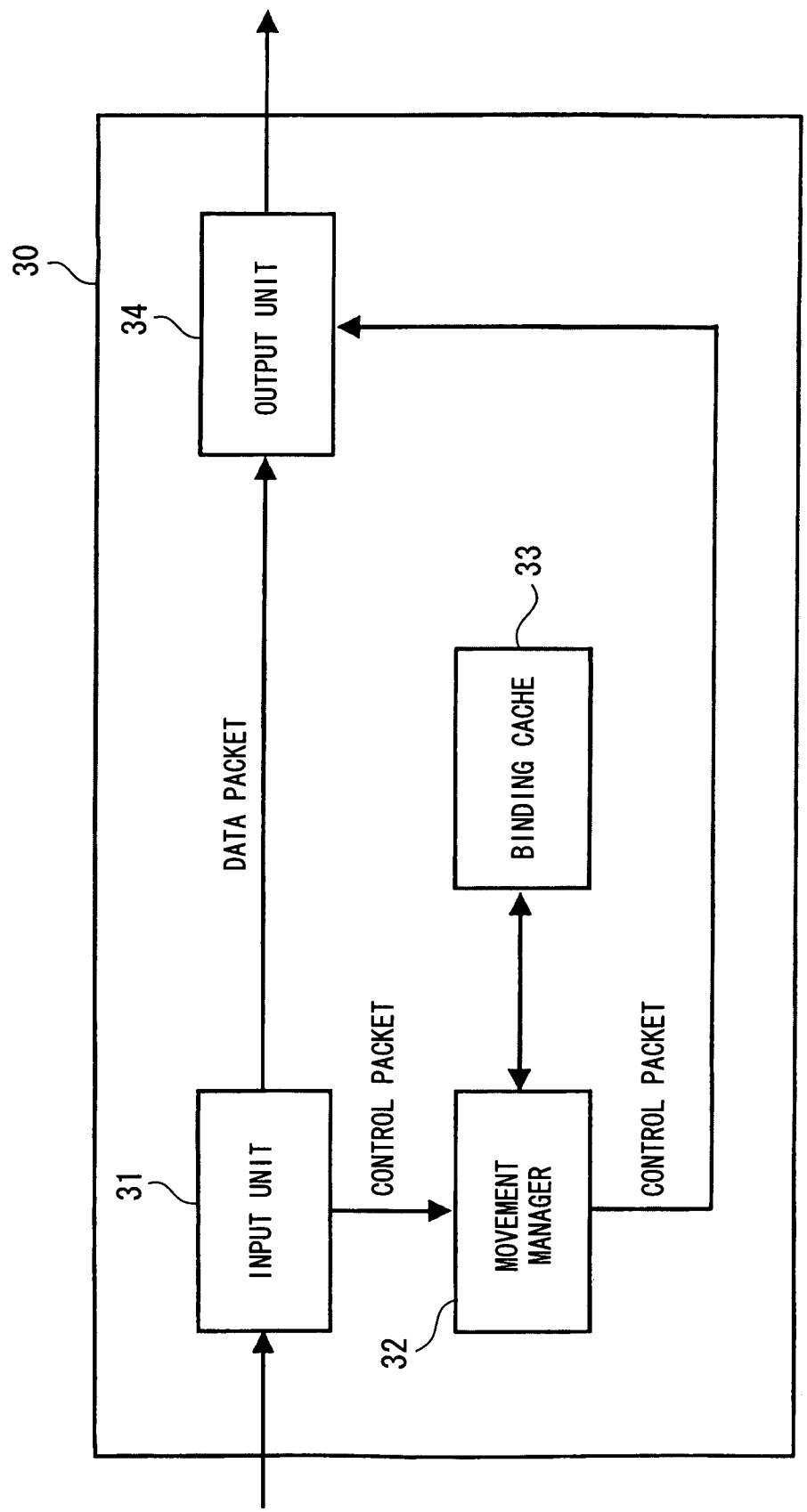
FIG. 3 is a diagram illustrating an example of the construction of a second router (FA#2)
Figure 4:
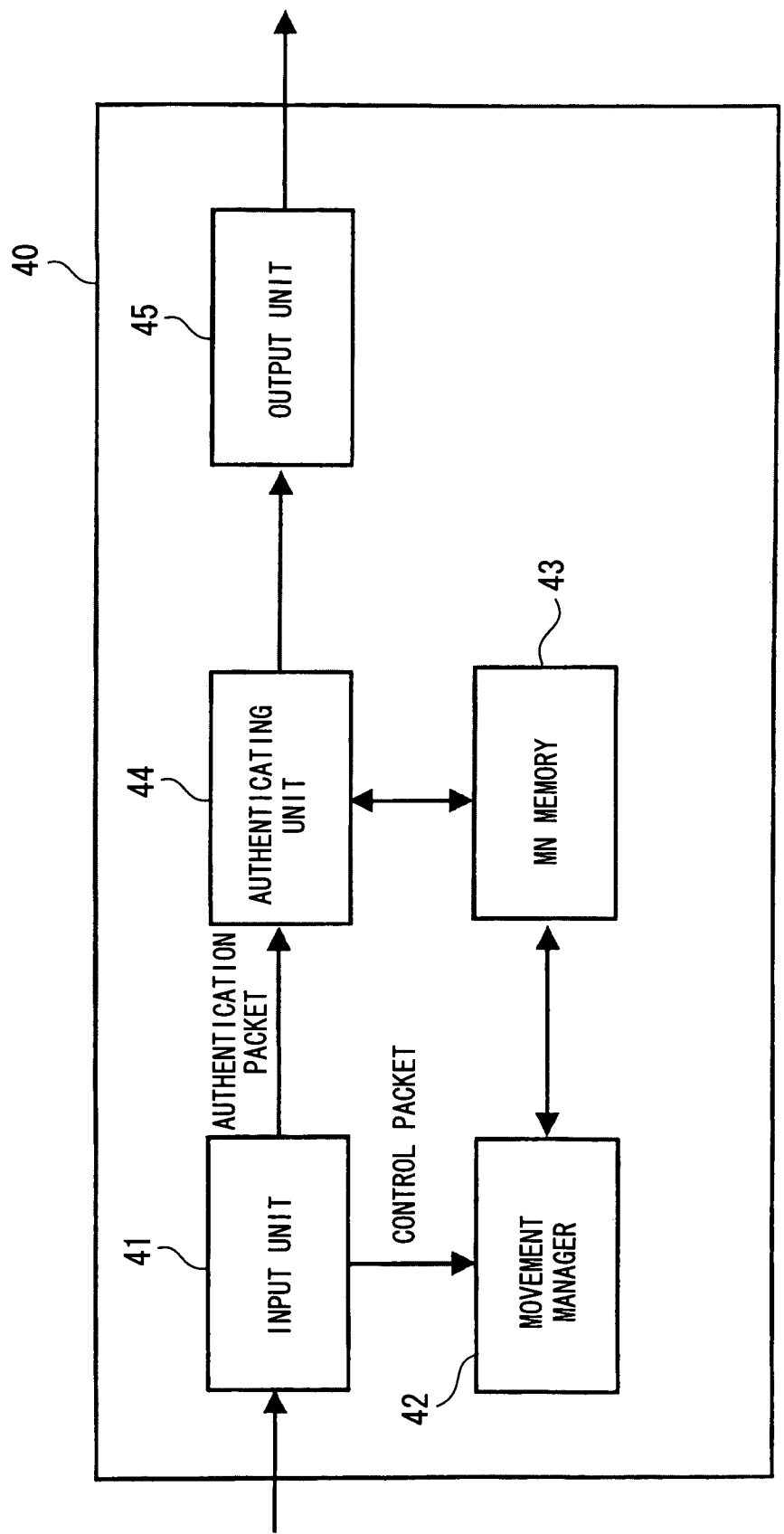
FIG. 4 is a diagram illustrating an example of the construction of an AAA server.
Figure 5:
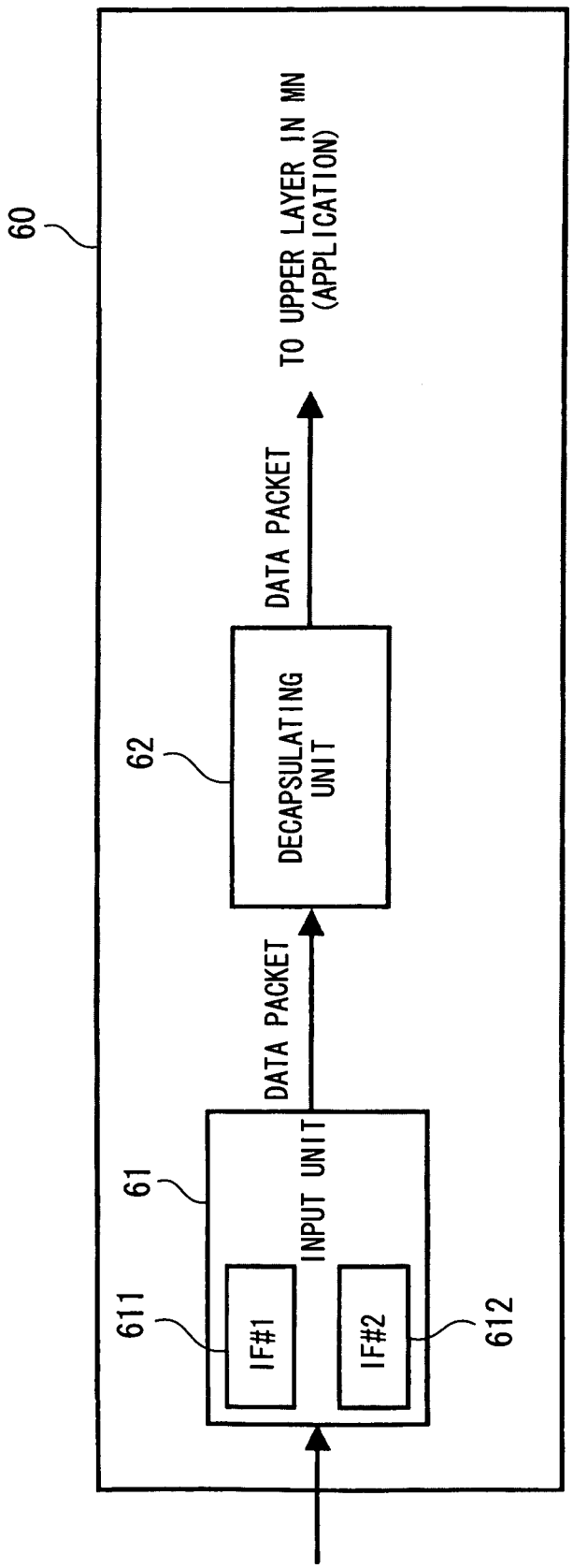
FIG. 5 is a diagram illustrating an example of the construction of a Mobile Node (MN)

Next, the construction of each unit will be described. FIG. 2 shows the construction of the first router (FA#1) 20, FIG. 3 shows the construction of the second router (FA#2) 30, FIG. 4 shows the construction of the AAA server 40 and FIG. 5 shows the construction of the Mobile Node (MN) 60.

As shown in FIG. 2, the first router (FA#1) 20 has an input unit 21, a movement managing unit 22, a binding cache 23, an encapsulating unit 24 and an output unit 25.

The input unit 21 receives a packet from the Correspondent Node (CN) 10 or the Mobile Node (MN) 60, refers to the content of the received packet, outputs a control packet (registration message (Binding Update), etc.) to the movement managing unit 22 and outputs the data packet to the encapsulating unit 24.

The movement managing unit 22 analyzes the content of the control packet, and stores into the binding cache 23 an original IP address (for example, "a1") used by the Mobile Node (MN) 60 and an IP address (for example, "b1") which is newly allocated to the Mobile Node (MN) 60. The movement managing unit 22 generates a reply to the second router (FA#2) 30 and a control packet for communication to the AAA server 40 (particularly, a packet for notifying the IP address which is first used by the Mobile Node (MN) 60).

The binding cache 23 is, for example, a memory for storing the original IP address used by the Mobile Node (MN) 60 and the newly allocated IP address. The address information (the IP address in this embodiment) before and after the location change of the Mobile Node (MN) 60 is stored in the binding cache 23.

The encapsulating unit 24 reads out the newly allocated IP address from the binding cache 23 and encapsulates the data packet by using the read-out IP address. For example, the encapsulating unit 24 encapsulates a data packet having a transmission destination address of "a1" to create a data packet having a transmission destination address of "b1".

The output unit 25 outputs the data packet from the encapsulating unit 24 and the control packet from the movement managing unit 22 to the outside.

FIG. 3 is a diagram showing an example of the construction of the second router (FA#2) 30. The second router (FA#2) 30 has an input unit 31, a movement managing unit 32, a binding cache 33 and an output unit 34.

The input unit 31 refers to the contents of the reception packets from the first router (FA#1) 20, the Mobile Node (NM) 60, etc., outputs the control packet (AAA reply, Binding Ack, etc.) to the movement managing unit 32 and outputs the data packet to the output unit 34.

The movement managing unit 32 analyzes the content of the control packet, and stores into the binding cache 33 the original IP address (for example, "a1") used by the Mobile Node (MN) 60, the newly allocated IP address (for example, "b1") and the address of the first router (FA#1) 20. The movement managing unit 32 creates a control packet such as a registration message (Binding Update), etc.

The binding cache 33 is, for example, a memory for storing the original IP address of the Mobile Node (MN) 60 and the newly allocated IP address (for example, "a1" and "b1").

The output unit 34 outputs the data packet from the input unit 31 and the control packet from the movement managing unit 32 to the outside.

FIG. 4 is a diagram showing an example of the construction of the AAA server 40. The AAA server 40 has an input unit 41, a movement managing unit 42, an MN (Mobile Node) memory 43, an authenticating unit 44 and an output unit 45.

The input unit 41 refers to the content of the reception packet, outputs a control packet (a packet for notifying the original IP address "a1" used by the Mobile Node (MN) 60 or the like) to the movement managing unit 42 and outputs an authentication packet to the authenticating unit 44.

The movement managing unit 42 analyzes the content of the control packet, and stores the identification of the Mobile Node (MN) 60 (for example, NAI (Network Address Identifier)), the IP address used by the Mobile Node (MN) 60 (for example, "a1") and the address of the first router (FA#1) (for example, "FA#1") 20 into an MN memory 43.

The MN memory 43 is a memory for storing the identification of the Mobile Node (MN) 60, the IP address used by the Mobile Node (MN) 60 and the address of the first router (FA#1) 20.

When the Mobile Node (MN) 60 is authenticated, the authenticating unit 44 reads out the IP address (for example, "a1") of the Mobile Node (MN) 60 and the address of the first router (FA#1) 20, and outputs an authentication packet (AAA reply) packet to the output unit 45 while the IP address of the Mobile Node (MN) 60 and the address of the first router (FA#1) 20 are contained in the authentication packet.

The output unit 45 outputs the authentication packet from the authenticating unit 44 to the outside.

FIG. 5 is a diagram showing an example of the construction of the Mobile Node (MN) 60. The Mobile Node (MN) 60 has an input unit 61 and a decapsulating unit 62.

The input unit 61 receives the data packets from the first router (FA#1) 20 and the second router (FA#2) 30, and outputs them to the decapsulating unit 62. The input unit 61 has first and second interfaces ((NF#1, INF#2) 611, 612.

The decapsulating unit 62 removes a header portion of the encapsulated packet, takes out the original packet (the packet transmitted from the Correspondent Node (CN) 10 to the first router (FA#1) 20) inserted in the data portion and outputs the taken-out packet to an upper application in the Mobile Node (MN) 60.

Figure 6:
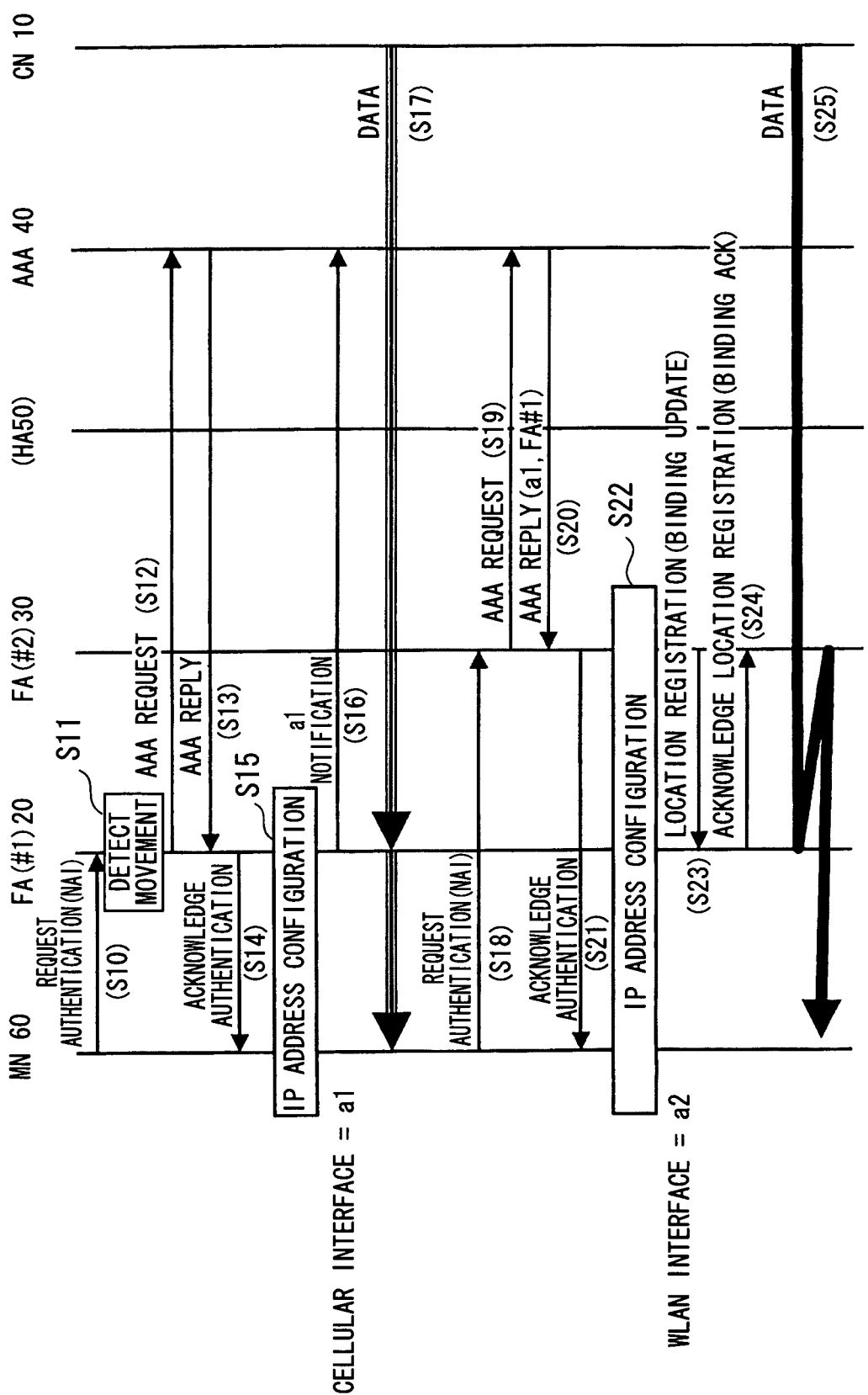
FIG. 6 is a diagram illustrating an example of a sequence when data are transmitted/received.
Figure 7:
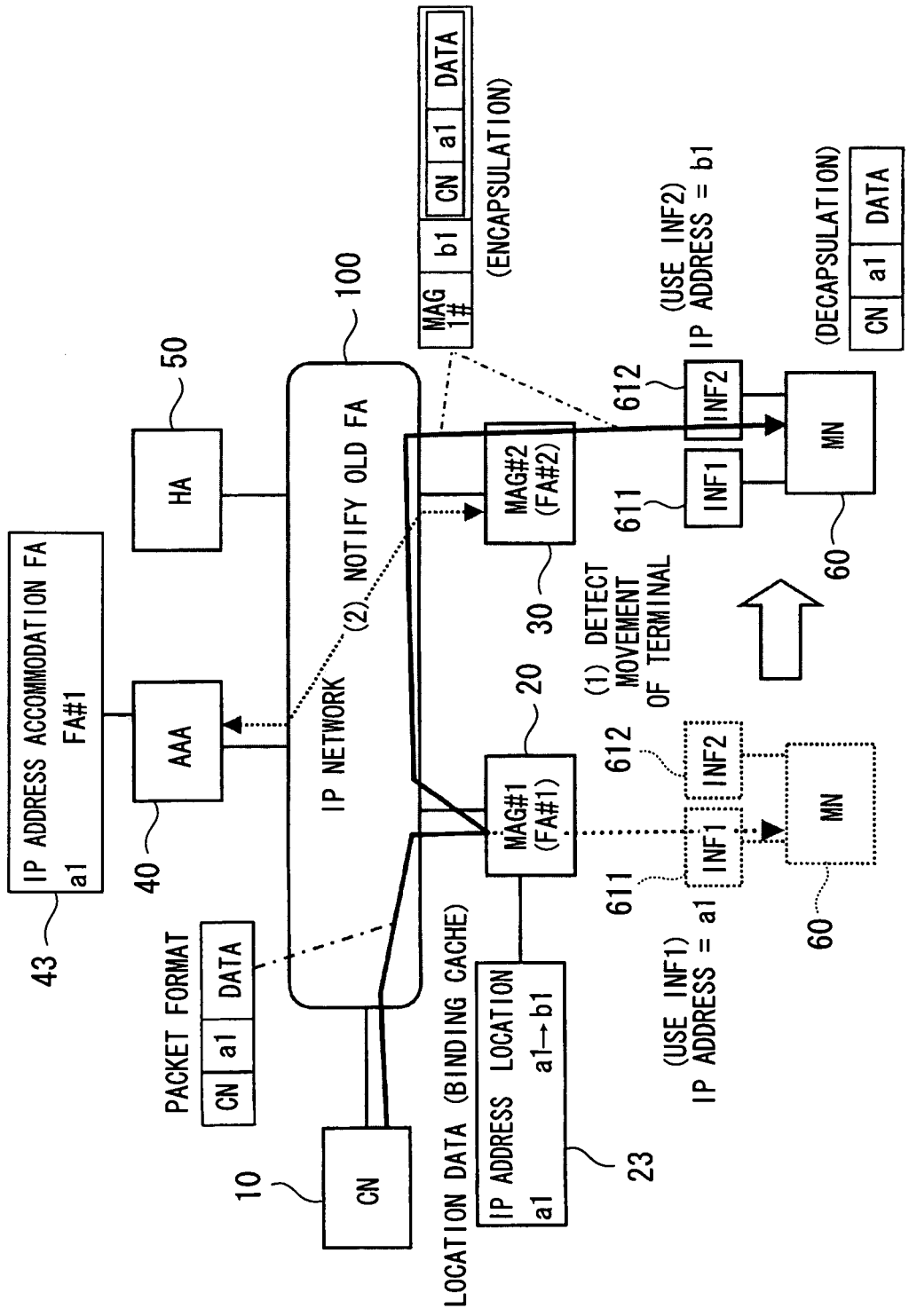
FIG. 7 is a diagram illustrating an example of the construction of a network system and data flow.
Figure 8:
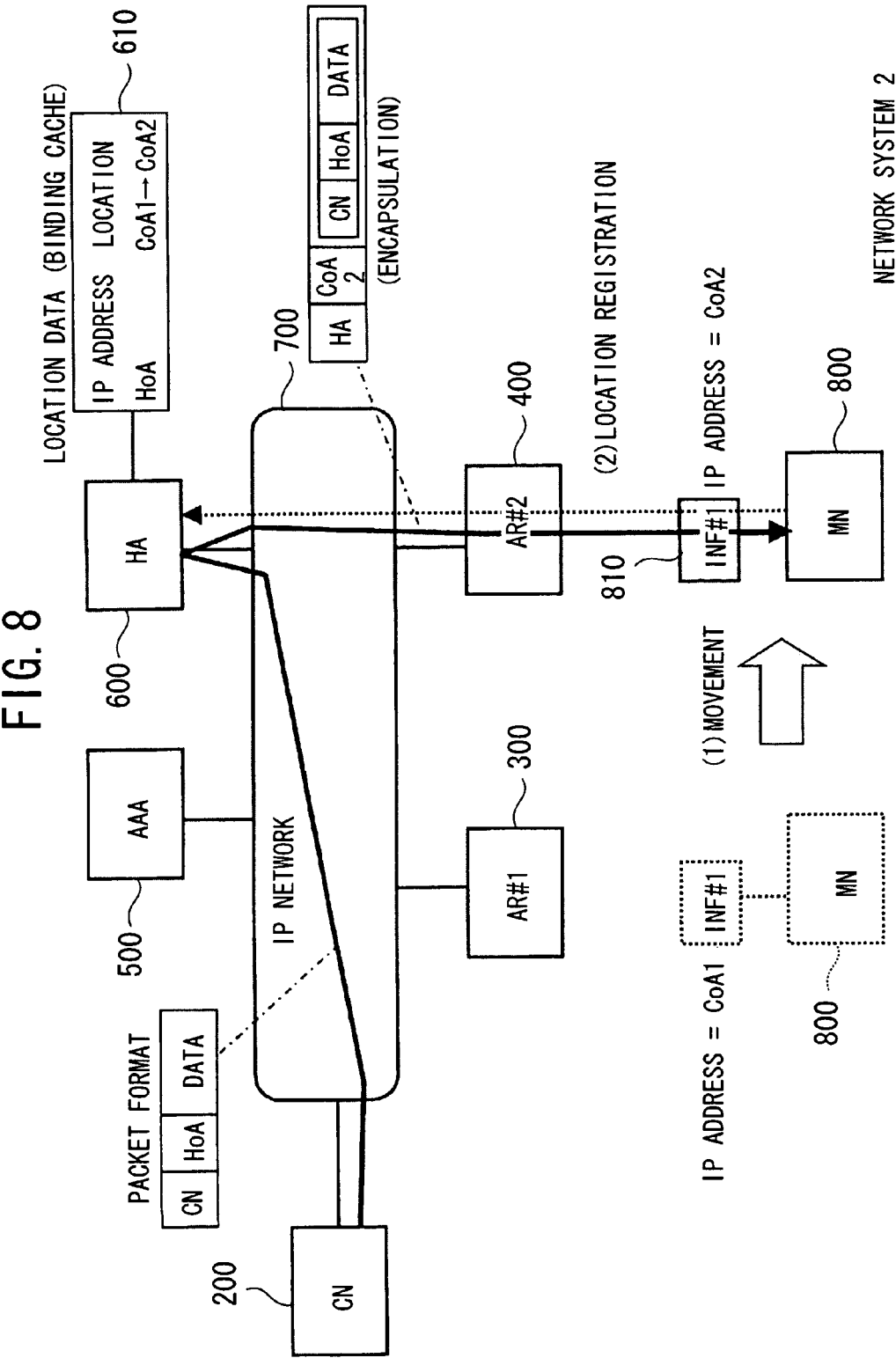
FIG. 8 is a diagram illustrating an example of the construction of the network system and data flow.
Figure 9:
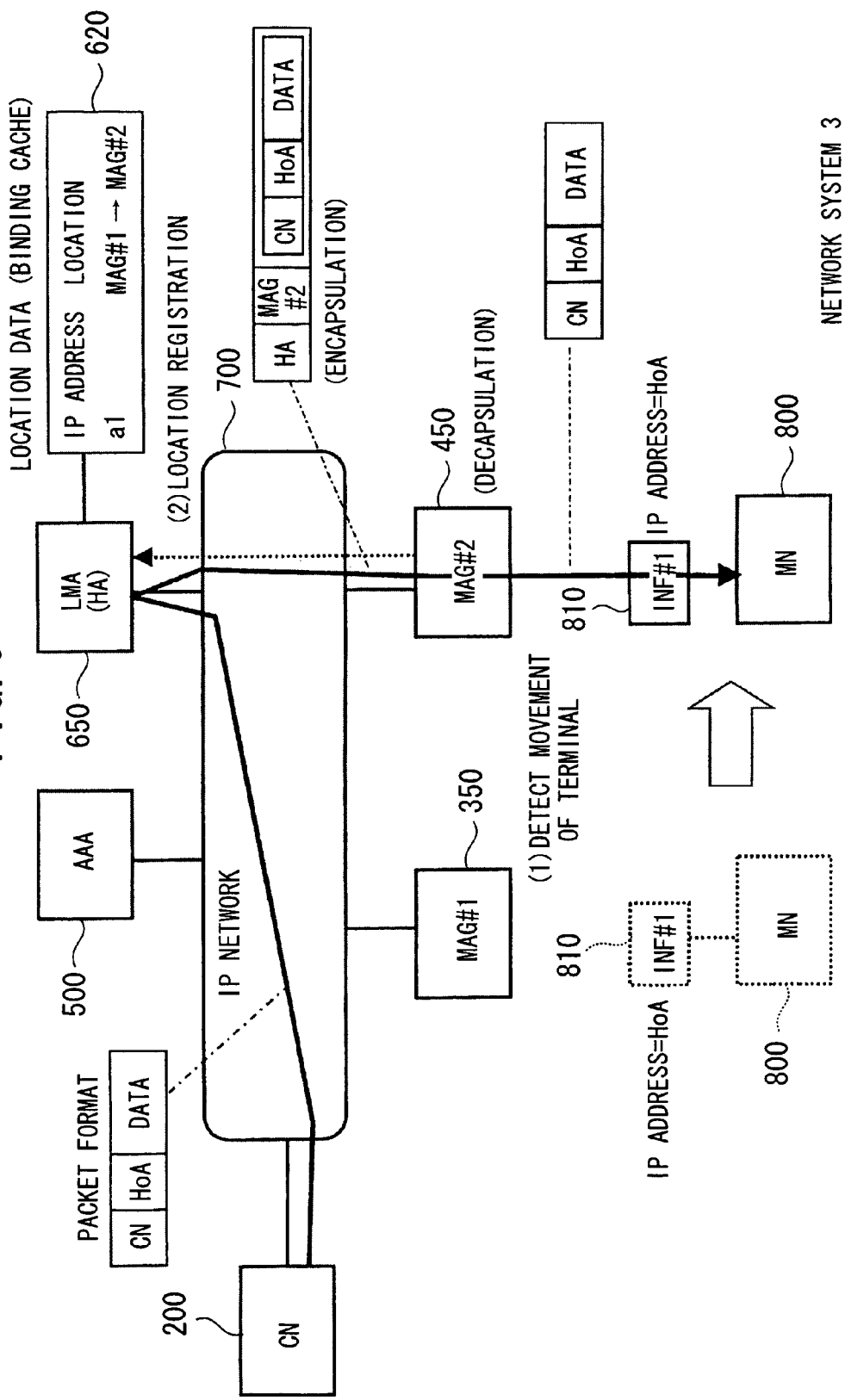
FIG. 9 is a diagram illustrating an example of the construction of the network system and data flow.

Next, the operation of the thus-constructed network system 1 will be described. FIG. 6 is a timing chart of data transmitted/received in the network system, and FIG. 7 is a diagram showing the flow of data transmitted/received in the network system 1.

First, when the Mobile Node (MN) 60 moves to a cell under the first router (FA#1) 20, the Mobile Node (MN) 60 transmits an authentication request to the first router (FA#1) 20 (S10). At this time, the Mobile Node (MN) 60 adds the identification thereof (for example, NAI) to the authentication request and then transmits them.

Subsequently, the first router (FA#1) 20 detects that the Mobile Node (MN) 60 moves to the cell under the first router (FA#1) 20 (S11) on the basis of the reception of the authentication request by the movement managing unit 22 of the first router (FA#1) 20 (S10). At this time, the movement managing unit 22 stores the identification information of the Mobile Node (MN) 60 into the binding cache 23.

Subsequently, the first router (FA#1) 20 transmits AAA request to the AAA server 40 (S12). This request includes the identification information of the Mobile Terminal (MN) 60. For example, the movement managing unit 22 generates and outputs AAA request added with the identification information.

Subsequently, the AAA server 40 transmits AAA replay to the first router (FA#1) 20 (S13). For example, when the authenticating unit 44 of the AAA server 40 receives AAA request, it stores into the MN memory 43 the identification information of the Mobile Node (MN) 60 contained in this request, and generates and outputs a AAA reply packet. By the transmission/reception of AAA request and AAA reply, the first router (FA#1) 20 transmits/receives authentication information of the Mobile Node (MN) 60 to/from the AAA server 40.

Subsequently, the first router (FA#1) 20 transmits the authentication reply to the Mobile Node (MN) 60 (S14). For example, it is transmitted by the movement managing unit 22.

When the authentication succeeds, the first router (FA#1) 20 executes the processing of providing an IP address (for example, "a1") to the Mobile Node (MN) 60, etc. (S15). At this time, in addition to the identification information of the Mobile Node (MN) 60, the provided IP address is stored in the binding cache 23 by the movement managing unit 22.

Subsequently, the first router (FA#1) 20 notifies the IP address (for example, "a1") of the Mobile Node (MN) 60 to the AAA server 40 (S16). This is notified on the basis of the control packet generated by the movement managing unit 22.

In addition to the identification information of the Mobile Node (MN) 60, the IP address of the Mobile Node (MN) 60 and the address of the first router (FA#1) 20 accommodating the Mobile Node (MN) 60 are stored in the MN memory 43 of the AAA server 40. The first router (FA#1) 20 notifies the IP address on the basis of the control packet. However, since a transmission source address is normally given to the packet, the movement managing unit 42 of the AAA server 40 takes out the address of the first router (FA#1) 20 of the transmission source from the control packet, takes out the IP address of the Mobile Node (MN) 60 contained in the control packet, and stores them into the MN memory 43 (see FIG. 7).

Thereafter, the Correspondent Node (CN) 10 transmits a data packet to the Mobile Node (MN) 60 (S17). The data packet addressed to the Mobile Node (MN) 60 is transmitted through the first router (FA#1) 20 to the Mobile Node (MN) 60. The Home Agent (HA) 50 does not hold any binding cache for managing the present location of the Mobile Node (MN) 60, and the data packet is directly transmitted from the first router (FA#1) 20 to the Mobile Node (MN) 60.

The Mobile Node (MN) 60 is handed over to move to the cell under the second router (FA#2) 30, and switches the communication device being used because of being out-of-service or the like.

Subsequently, the Mobile Node (MN) 60 transmits an authentication request to the second router (FA#2) 30 as the move destination (S18). At this time, the Mobile Node (MN) 60 also transmits the identification information thereof (for example, NAI).

Subsequently, the second router (FA#2) 30 transmits a AAA request to the AAA server 40 (S19), and the AAA server 40 transmits a AAA reply to the second router (FA#2) 30 (S20). The second router (FA#2) 30 authenticates the Mobile Node (MN) 60 with the AAA server 40.

At this time, the AAA server 40 adds the AAA reply with the IP address (for example, "a1") used by the Mobile Node (MN) 60 and the address (for example, "FA#1") of the first-accessed first router (FA#1) 20 which are stored in the MN memory 43, and then transmits them.

That is, the IP address (for example, "a1") used by the Mobile Node (MN) 60 and the address (for example, "FA#1") of the first router (FA#1) 20 as well as the identification information of the Mobile Node (MN) 60 are stored in the MN memory 43 through the processing of S12. The movement managing unit 42 accesses the MN memory 43 on the basis of the identification information of the Mobile Node (MN) 60 contained in the AAA request to read out two addresses, and adds them to the AAA reply.

The second router (FA#2) 30 stores the two addresses ("a1" and "FA#1") contained in the AAA request into the binding cache 33 together with the identification information of the Mobile Node (MN) 60.

Subsequently, the second router (FA#2) 30 transmits the authentication acknowledge to the Mobile Node (MN) 60 (S21). If the authentication succeeds, the second router (FA#2) 30 executes the processing of providing the IP address (for example, "b1") to the Mobile Node (MN) 60 (S22).

Subsequently, the second router (FA#2) 30 transmits the registration message (Binding Update) to the first router (FA#1) 20 (S23).

The second router (FA#2) 30 sets the address of the router of the first connection destination (first router (FA#1) 20) received through the processing of S20 to a destination address of the registration message. Furthermore, the second router (FA#2) 30 contains, in the registration message, the original address (for example, "a1") used by the Mobile Node (MN) 60 also received through the processing of S20. Furthermore, the second router (FA#2) 30 includes the newly allocated IP address (for example, "b2") into the registration message.

When receiving the registration message, the first router (FA#1) 20 stores the IP address (for example, "a1") used by the Mobile Node (MN) 60 and the newly allocated IP address (for example, "b1") into the binding cache 23, and transmits the registration acknowledge (Binding Ack) to the registration message to the second router (FA#2) 30 (S24).

The subsequent flow of the data packet (S25) is as follows. That is, as shown in FIG. 7, the Correspondent Node (CN) 10 transmits the data packet to the Mobile Node (MN) 60, and the first router (FA#1) 20 intercepts the data packet.

The first router (FA#1) 20 refers to the binding cache 23 to set the destination address to the IP address newly-allocated to the Mobile Node (MN) 60 (or the currently used IP address, for example "b1"), encapsulates the data packet and then transmits it to the IP network 100.

The second router (FA#2) 30 directly transmits the encapsulated data packet to the Mobile Node (MN) 60.

The Mobile Node (MN) 60 decapsulates the encapsulated data packet by taking out the data inserted in the data portion, and restores the data packet transmitted from the Correspondent Node (CN) 10 (the destination address is the IP address allocated to the Mobile Node (MN) 60).

Subsequently, the Mobile Node (MN) 60 executes various kinds of applications on the basis of the restored packet data.

As described above, in the network system 1 of this embodiment, when the Mobile Node (MN) 60 changes the communication device, the processing of call release and call re-connection is not carried out between the Mobile Node (MN) 60 and the second router (FA#2) 30 or the like (see FIG. 6). Accordingly, in this network system 1, the service interruption time can be shortened by the time which would be required if the above call release and call re-connection processing is executed. Furthermore, as described above, the Mobile Node (MN) 60 can continuously enjoy the service without transmitting any registration message.

In the above-described embodiment, the AAA server 40 stores the address of the first router (FA#1) 20 in which the Mobile Node (MN) 60 is first accommodated, and then notifies the address of the first router (FA#1) 20 to the second router (FA#2) 30 when the Mobile Node (MN) 60 moves to the cell under control of the second router (FA#2) 30 (S16, S20). This is because the notified address is used as a destination address when the second router (FA#2) 30 issues a registration message to the first router (FA#1) 20 (S23). However, the AAA server 40 may not transmit the address of the first router (FA#1) 20 to the second router (FA#2) 30, and also the second router (FA#2) 30 may not obtain the address of the first router (FA#1) 20. In this case, the second router (FA#2) 30 transmits the destination address of the location registration message while the destination address is set to an initial IP address (for example, "a1"), and the first router (FA#1) 20 intercepts this address. The location registration message contains the IP address of the Mobile Node (MN) 60 which is newly allocated by the second router (FA#2) 30, and thus the first router (FA#1) 20 can analyze the content of the location registration message and renew the data stored in the binding cache 23 from the destination address (for example, "a1") and the IP address (for example, "b1") of the Mobile Node (MN) 60 contained in the location registration message.

In the above-described embodiment, the initial IP address (for example, "a1") of the Mobile Node (MN) 60 and the address of the initial router (first router (FA#1) 20) are stored by the AAA server 40. However, the address concerned may be stored by a device other than the AAA server 40 such as a Home Agent (HA) 50 or the like. However, it is desired that the address is transmitted/received in a sequence (AAA request, AAA reply in the above example) which is predetermined or described in Proxy Mobile IP or the like. This is because the service interruption time is long due to the transmission/reception processing.

Furthermore, in the above-described embodiment, the Mobile Node (MN) 60 moves to a cell under the first router (FA#1) 20 to a cell under the second router (FA#2) 30, and the communication device is changed. However, the present invention may be applied to a case where the Mobile Node (MN) 60 does not move, but changes the communication device. Thus, in a broad sense "move" relates to simply the changing of communication devices and not necessarily limited to the mobile node physically moving. This is because the AAA server holds the information on the address of the router (FA#1) 20 to which the Mobile Node (MN) 60 first connects and the IP address used at that time, and the first connected router (FA#1) 20 holds the binding cache. In this case, a data packet is encapsulated in the first router (FA#1) 20, and the encapsulated data packet is transmitted to the Mobile Node (MN) 60 existing under the first router (FA#1) 20 and decapsulated in the Mobile Node (MN) 60.

Furthermore, with respect to changing the communication device, the communication device may be changed to a communication device low in cost (for example cost of communication) or to a communication device having strong reception electric waves with handover or the like as a trigger, or the communication may be manually changed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A network system comprising:
   a mobile node;
   a correspondent node for transmitting/receiving a data packet to/from the mobile node;
   a first router to which the mobile node is coupled at a visited domain; and
   a second router to which the mobile node couples to when the mobile node moves from the first router, wherein the second router has a location registration message generating unit for generating a location registration message of the mobile node including a first network address allocated to the mobile node when coupled to the first router before the mobile node moves and a second network address allocated to the mobile node when coupled to the second router after the mobile node moves and transmitting the location registration message to the first router,
   the first router including:
   a binding cache;
   a movement managing unit for receiving the location registration message and storing into the binding cache the first network address allocated to the mobile node when coupled to the first router before the mobile node moves and the second network address allocated to the mobile node when coupled to the second router after the mobile node moves; and
   an encapsulating unit for receiving a data packet from the correspondent node, generating an encapsulated data packet by encapsulating the data packet, and transmitting the encapsulated data packet designated as a transmission destination the second network address which is stored in the binding cache after the move,
   wherein the mobile node includes a decapsulating unit for receiving the encapsulated data packet and decapsulating the encapsulated data packet.

2. The network system according to claim 1, wherein the first router is a router through which the mobile node first connects to a network at a visited domain.

3. The network system according to claim 1, wherein the network system has a server for holding address information which is first used with the first router and address information of the first router.

4. The network system according to claim 1, wherein the mobile node comprises more than one communication device and the move from the first router results from a change of communication devices by which the mobile node utilizes for communication.

5. The network system according to claim 3, wherein the server transmits to the second router the address information which is first used by the mobile node when the server authenticates the mobile node.

6. The network system according to claim 3, wherein after a movement managing unit of the first router allocates to the mobile node the address information to be first used, the movement managing unit stores the address information to be first used into the binding cache as address information before the move and also transmits the address information to be first used to the server.

7. The network system according to claim 3, wherein the server transmits the first used address information and the address information of the first router to the second router.

8. The network system according to claim 7, wherein the location registration message generating unit of the second router transmits to the first router the location registration message containing the first used address information which is received from the server, and the address information newly allocated to the mobile node.

9. The network system according to claim 8, wherein the movement managing unit of the first router stores the newly allocated address information contained in the location registration message into the binding cache as the address information after the move, and encapsulating the data packet while the transmission destination of the data packet is changed from the first used address information to the newly allocated address information.

10. The network system according to claim 3, wherein the server is an Authentication, Authorization, and Accounting Server for authenticating and allowing the mobile node.

11. A data transmitting/receiving method in a network system including a mobile node, a correspondent node for transmitting/receiving a data packet to/from the mobile node, a first router to which the mobile node is coupled at a visited domain, and a second router to which the mobile node is coupled at a moving destination to which the mobile node moves from the first router, comprising:

generating a location registration message of the mobile node including a first network address allocated to the mobile node when coupled to the first router before the mobile node moves and a second network address allocated to the mobile node when coupled to the second router after the mobile node moves and transmitting the location registration message from the second router to the first router;

receiving the location registration message, storing into a binding cache the first network address allocated to the mobile node when coupled to the first router before the mobile node moves and the second network address allocated to the mobile node when coupled to the second router after the mobile node moves, generating an encapsulated data packet by encapsulating a data packet when the data packet is received from the correspondent node, and transmitting the encapsulated data packet designated as a transmission destination the second network address which is stored in the binding cache after the move by the first router; and receiving the encapsulated data packet and decapsulating the encapsulated data packet by the mobile node.

12. A non-transitory computer readable medium embodying a data transmission/reception program for execution by a computer constituting a network system including a mobile node, a correspondent node for transmitting/receiving a data packet to/from the mobile node, a first router to which the mobile node is coupled at a visited domain, and a second router to which the mobile node is coupled at a moving destination to which the mobile node moves from the first router, the program making the computer execute:

generating a location registration message of the mobile node including a first network address allocated to the mobile node when coupled to the first router before the mobile node moves and a second network address allocated to the mobile node when coupled to the second router after the mobile node moves and transmitting the location registration message from the second router to the first router;

receiving the location registration message, storing into a binding cache the first network address allocated to the mobile node when coupled to the first router before the mobile node moves and the second network address allocated to the mobile node when coupled to the second router after the mobile node moves, generating an encapsulated data packet by encapsulating a data packet when the data packet is received from the correspondent node, and transmitting the encapsulated data packet designated as a transmission destination the second network address stored in the binding cache after the move by the first router; and receiving the encapsulated data packet and decapsulating the encapsulated data packet by the mobile node.

* * * * *